United States Patent [19]

Leenhouts

[11] 4,119,901

[45] Oct. 10, 1978

[54] PULSE TO STEP MOTOR STABILIZING CIRCUIT

[75] Inventor: Albert C. Leenhouts, Harwinton, Conn.

[73] Assignee: The Superior Electric Company, Bristol, Conn.

[21] Appl. No.: 619,360

[22] Filed: Oct. 3, 1975

[51] Int. Cl.² ............................................. G05B 19/40
[52] U.S. Cl. .................................... 318/685; 318/696
[58] Field of Search ...................... 318/685, 696, 138

[56] References Cited

U.S. PATENT DOCUMENTS

| 3,463,985 | 8/1969 | Fredriksen | 318/685 |
| 3,466,517 | 9/1969 | Leenhouts | 318/696 |
| 3,553,549 | 1/1971 | Leenhouts | 318/138 |
| 3,573,593 | 4/1971 | Beery | 318/696 |
| 3,575,653 | 4/1971 | Gucwa | 318/685 |
| 3,605,000 | 9/1971 | Inaba | 318/685 |
| 3,908,195 | 9/1975 | Leenhouts | 444/1 |

Primary Examiner—Robert K. Schaefer
Assistant Examiner—J. J. Feldhaus
Attorney, Agent, or Firm—Ernest M. Junkins

[57] ABSTRACT

A circuit for accepting a train of command pulses produced as a number of evenly spaced pulses for each consecutive equal time interval and which may have abrupt small changes in rates between adjacent time intervals and providing a motor pulse for each command pulse to a digital pulse to step motor circuit with the motor pulses having less abrupt rate changes and lagging its corresponding command pulse generally by about the extent of a time interval and in which the deviation of the position of the motor's rotor from its energized dictated position also alters the rate of the motor pulses in order to decrease the tendency of the motor to flutter, oscillate and/or lose synchronism especially when the motor is operating at a light or no load within a moderate velocity range.

19 Claims, 2 Drawing Figures

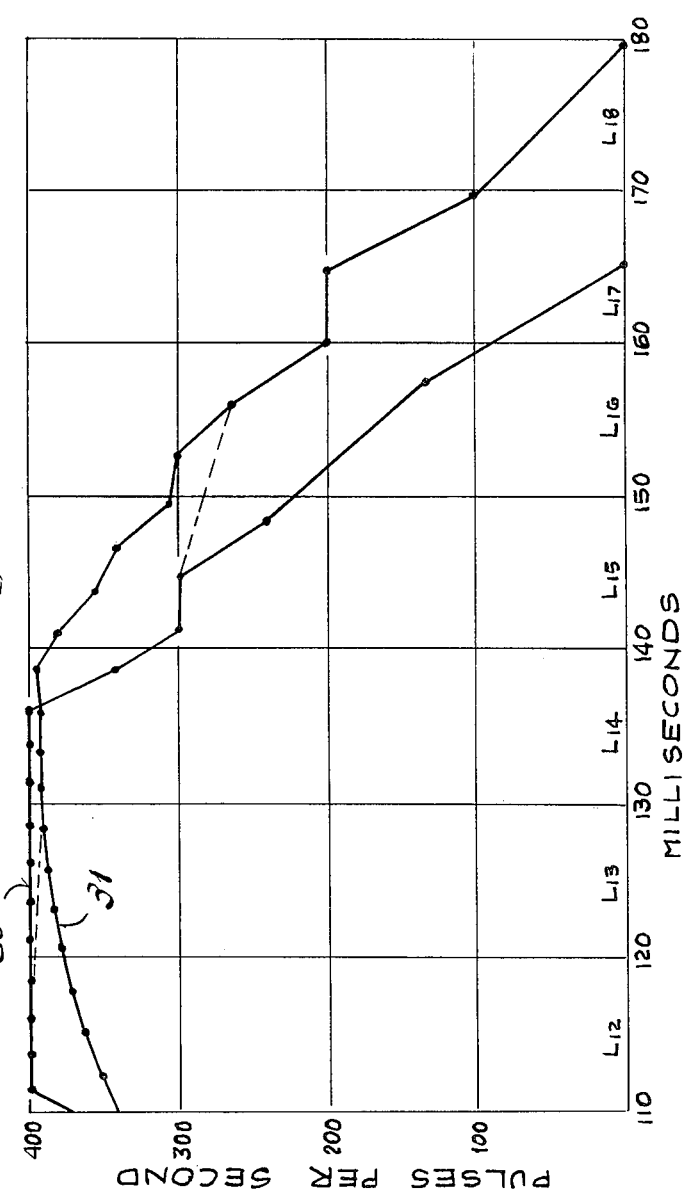

PULSE TO STEP MOTOR STABILIZING CIRCUIT

The present invention relates to a stepping or pulse to step motor circuit in which each command pulse received is made to change the energization of a stepping motor so that the motor produces a step essentially simultaneously with the receipt of a command pulse. While command pulses may easily have abrupt changes in rates, the motor is only capable of responding to limited changes in its stepping rates. Under some conditions, such as light or no loads and at stepping rates producing moderate velocities, the motor may become unstable if required to maintain simultaneousness with the abrupt command pulse changes in rates. In some instances, not only may the motor not produce a step for each command pulse but it may become unstable and flutter or oscillate to thereby be unsatisfactory.

It is accordingly an object of the present invention to provide a motor control stabilizing circuit that increases the ability of a digital, pulse to step motor to produce stable operation even at moderate velocities, light loads and abrupt command pulse rate changes.

Another object of the present invention is to achieve the above object with a motor circuit that produces a motor pulse for each command pulse with each motor pulse generally lagging behind its corresponding command pulse a duration that is generally approximately constant.

A further object of the present invention is to provide a motor stabilizing circuit which senses at least excessive deviation of the motor from its motor pulse dictated position and alters the motor pulse rate to decreases the deviation.

Still another object of the present invention is to provide a pulse to step motor control stabilizing circuit that is readily compatible with presently existing motor control circuits, is quite economical to manufacture while being reliable in use and which tends to increase the ability of the motor to change its velocity as compared to heretofore known motor control circuits.

In carrying out the present invention, the stabilizing circuit provides a motor pulse for each command pulse by the command pulses being received by a summing circuit which increments its count for each command pulse while an oscillator produces motor pulses with each motor pulse effecting both a change of energization of the motor windings to produce a step and a decrementing of the summing circuit. The instantaneous count of the summing circuit is supplied to a digital count to analog voltage converter which produces a voltage related to the instantaneous count and this voltage is in turn applied to the voltage controlled oscillator to have the oscillator produce motor pulses at a rate essentially equal to the instantaneous count for a time interval.

When the present circuit receives command pulses in which there is a rate change, as for example, four evenly spaced pulses over a ten millisecond time interval and then five evenly spaced pulses over the next consecutive ten millisecond time interval, the rate of the motor pulses is only gradually changed from the prior rate of four to the present rate of five during the second time interval. Each motor step is produced later in time than its corresponding command pulse with the time difference generally approximating the duration of a time interval. Accordingly when the present system is used on each axis of a multi-axes motion control system, excessive path deviation caused by such a time difference is prevented as each system will have essentially a common time differential between command and motor pulses.

In addition to adjusting the rate of the motor pulses in accordance with the rate of the command pulses, the present invention further senses the relationship of the instantaneous position of the rotor of the motor with respect to the position it should have as dictated by its instantaneous state of energization. This difference is called the phase angle and its nominal value generally depends upon the load that is driven by the motor. Though the normal phase angle has a nominal value, excessive deviation may occur therefrom, as for example, when the motor is going faster than the energizations so that the phase angle then may become so advanced as to be much less than its nominal value or if the motor is going slower than its energizations so that the phase angle then may become much larger than its nominal value. However, the present invention senses at least the excessive value of the phase angle and causes the oscillator to increase its motor pulse rate as the phase angle becomes less than its nominal value while the motor pulse rate is decreased as the phase angle value exceeds its nominal value.

By varying the motor pulse rate a small percentage, as for example, on the order of 10% from that dictated by the rate of the command pulses, and in accordance with the error in the instantaneous phase angle, the present circuit further reduces the tendency of the motor to become unstable in operation.

Other features and advantages will hereinafter appear.

In the drawing —

FIGS. 2 and 2a show a chart of the occurrence of command pulses and motor pulses for a typical motion.

Figure 1:
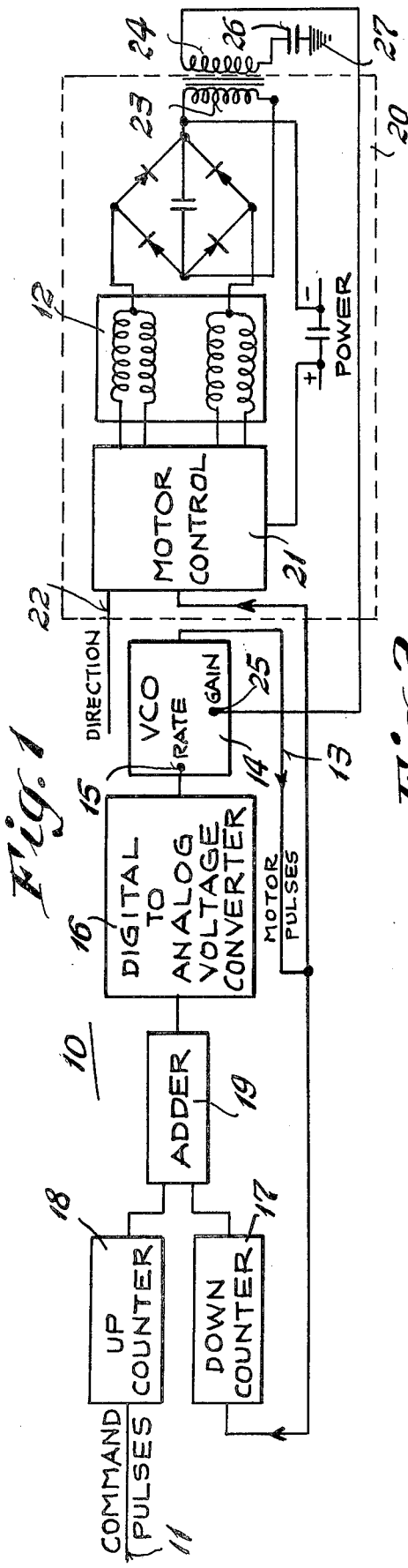
FIG. 1 is a block diagram of the pulse to step motor stabilizing circuit of the present invention.

Referring to the drawing, the pulse to step motor stabilizing circuit of the present invention is generally indicated by the reference numeral 10 and has an input lead 11 on which command pulses are received to require essentially simultaneously therewith production of one step by a stepping motor schematically shown within a block 12. In order to produce motor movement, the present invention converts each command pulse into a motor pulse with the latter appearing on a lead 13 as the output of a voltage controlled oscillator 14 having a rate input control 15 that is connected to the output of a digital count to analog voltage converter 16. The input to the converter 16 is a representation of the count of the instantaneous difference between the number of command pulses and the number of motor pulses by the motor pulses being directed to the count terminal of a down counter 17 while the command pulses are directed by the lead 11 to the count terminal of an up counter 18. The instantaneous count difference therebetween is determined by an adder 19 which applies it to the converter 16.

The motor pulses from the oscillator 14 are additionally directed to a dotted line block 20 which includes the motor 12 and a motor control 21, the latter serving to provide the proper sequence of energization to the motor windings for each motor pulse as determined by an input direction command on a lead 22. The components shown within the dotted line block 20, including an inductor 23, constitute a motor stabilizing circuit that is disclosed in U.S. Pat. No. 3,684,934, assigned to the assignee of the present invention and is designed to minimize the tendency of the stepping motor 12 to oscillate under certain conditions as described in said U.S. patent.

The present invention provides a winding 24 that is wound on the inductor 23 with the winding 24 having one end connected to a gain control 25 of the oscillator 14 and its other end connected to a condenser 26 which has its other side grounded as at 27.

The value of the voltage induced in the winding 24 is related to the current drawn by the motor windings and acts as an indicator of the phase angle of the motor. While other and different circuits, as for example, mechanical sensing devices such as encoders may be utilized to sense and provide a signal of the phase angle, the present invention by utilizing the circuit described in said patent, obtains the advantages of said circuit and in addition enables the structure for obtaining the phase angle's signal to be extremely economical and reliable.

Figure 2:
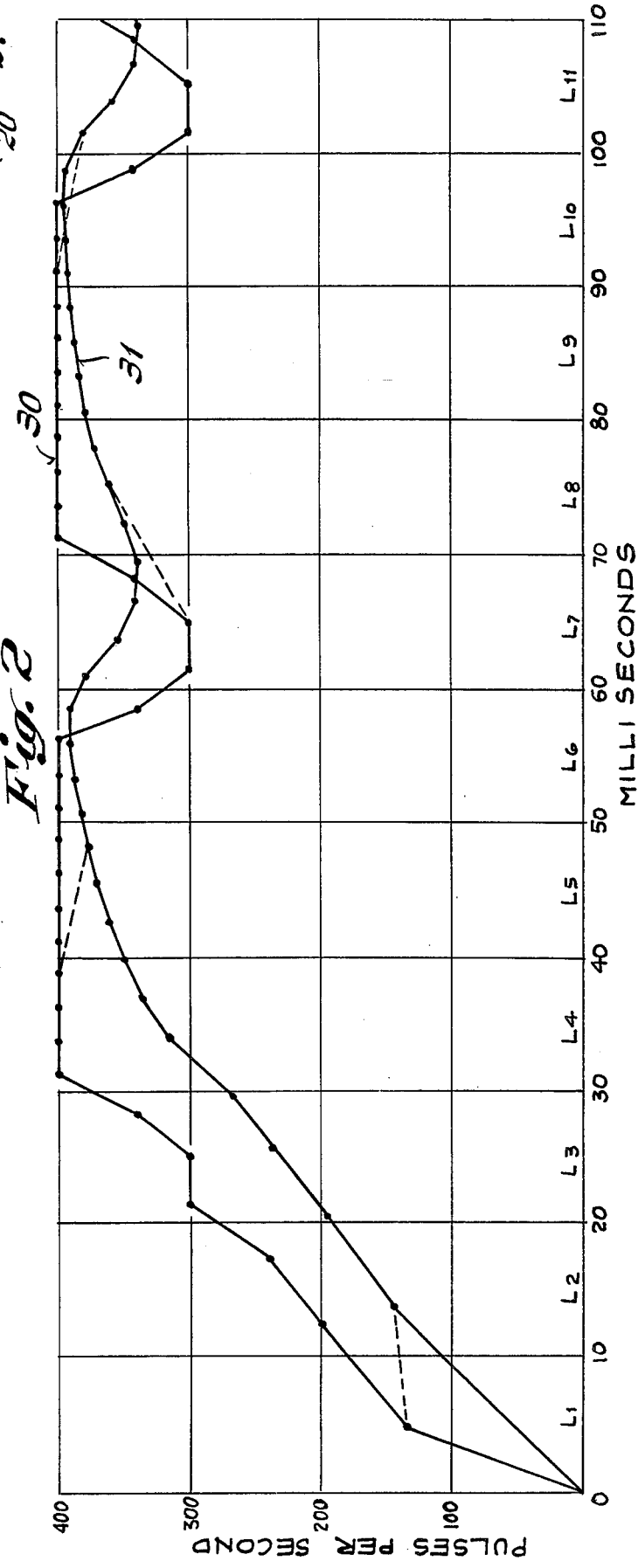

Referring to FIG. 2 in which time is the common abscissa in milliseconds, reference numeral 30 indicates a plot of command pulses and numeral 31 a plot of motor pulses with the common ordinate being pulse rates in pulses per second. The command pulses are received in equal length time intervals L1 through L17 with consecutive intervals having evenly spaced pulses of 1, 2, 3, 4, 4, 4, 3, 4, 4, 4, 3, 4, 4, 4, 3, 2, and 1. Such command pulses may be derived from the system shown in my U.S. Pat. No. 3,908,195. It will be noted that the number of pulses between adjacent time intervals varies only by a maximum difference of 1 and the duration of the time interval is selected by the ability of the motor to alter its velocity by such a maximum number within the duration of the time interval.

The curve 30 has relatively abrupt changes in rates at around the 60 and 100 millisecond points which has been found at times to produce erratic operation of the motor especially at light or no loads. However, the curve 31 of the motor pulses is substantially smoother with less abrupt changes.

The abscissa distance between the two curves represents the time lag between the occurrence of a command pulse and the occurrence of its corresponding motor pulse. Command and motor pulses 1, 10, 20, 30, 40 and 50 are joined by dotted lines to indicate their correspondence with there being a time differential of 8.75, 9.40, 10.27, 9.94, 9.77 and 11.11 milliseconds respectively therebetween. For all pulses except the last three, the time differential varies from the duration of a time interval (10 milliseconds) by no more than two milliseconds. For the last three pulses, differentials of 12.41, 12.45 and 14.95 milliseconds respectively occur.

In general, the time lag approximates the time interval and this is basically caused by the adder 19 having a count over most of a time interval that is equal to the number of pulses in the preceding time interval. Further, the oscillator pulse rate per time interval is made to closely correspond to the count of the adder.

Thus, the present circuit produces an essentially constant time difference between a command pulse and its corresponding motor step so as to enable it to be used with one or more similar motor circuits in multi-axes systems without producing a path that substantially deviates from that dictated by the pattern of command pulses to the different axes.

Though the above circuit provides for essentially a gradual change in the rate of the motor pulses as compared to the abrupt changes in the command pulse rates, it has also been found that in some situations the motor may tend to become unstable by having its phase angle excessively deviate from its nominal phase angle. The minimize this deviation, the winding 24 produces to the gain control 25, a voltage which increases in value when the phase angle is less than nominal to cause the oscillator to increase the rate of the motor pulses over that which is commanded by the converter 16. This in turn increases the rate of changes of energization to the motor and causes the deviation to be reduced. Moreover, as a motor pulse is produced faster than commanded by the rate of the command pulses, the count of the adder is decreased quicker than normal which in turn reduces the rate of the next motor pulse or pulses. With the error between motor position and energization having been decreased, the motor now tends to follow the changes of energization and stay about its nominal phase angle value. For an error wherein the phase angle value is greater than nominal, the gain control 25 receives a decreased voltage which decreases the rate of the motor pulses to minimize the difference to again alter the phase angle towards its nominal value.

It has been found that the gain control need only control the rate of the oscillator by a factor of perhaps plus or minus 10% in order to substantially minimize the unstable operation of the motor. One form of oscillator 14 which may be employed is produced by Signetics Corporation, Sunnyvale, Calif. and is identified as NE/SE555 monolithic timing circuit. The converter 16 would be connected to the control voltage terminal while the gain control 25 would be connected to the threshold terminal.

The capacity of the counters 17 and 18, the adder 19, and the converter 16 generally need be no more than the maximum number of pulses that can be expected in a selected time interval. Thus for a maximum 1,500 steps per second motor velocity with 10 millisecond time intervals, a capacity no greater than fifteen would be required. In addition to minimizing the cost of the present system, such small counts also enables the converter 16 and oscillator 14 to be quite accurately set to precise rates. The counters 17 and 18 are preferably of the count over, repeating form.

Though my U.S. Pat. No. 3,553,549, assigned to the assignee of the present invention, discloses a circuit having an instantaneous count difference register that is used indirectly to control the frequency of an oscillator which in turn produces motor pulses, it should be understood that the present invention relates to a substantially different problem. In said U.S. patent, the difficulty overcome relates to controlling the rate of motor velocity changes by the use of a non-linear voltage generating circuit that includes a limiting circuit to reach a velocity which is proportional to the square root of the count of the register. The present invention, by the direct connection between the adder count and oscillator rate, produces a motor pulse rate that is essentially the same as the instantaneous count and smooths abrupt changes in command pulse rates when the command pulse rates do not exceed the velocity change ability of the motor.

The present invention has particular utility when it receives pulses generated in accordance with the method and system disclosed in my heretofor noted U.S. Pat. No. 3,908,195. Thus, the command pulses are received in a manner, which while having abrupt rate changes, are still at rates which the motor should be capable of accommodating to produce a step. However, the reduction of the abruptness of the rate changes has been found to provide a more stabilized operation of the motor than if the command pulses were directly controlling the change of energization of the motor. Such stabilizing is particularly effective when for example the motor has moderate velocities of 500-1500 steps per second and drives a light load.

The direction of movement of the motor may be altered by changing the state of the direction lead 22, together with having command pulses of 1, 0 and −1 for consecutive time intervals. The present circuit however obviates the need for an up-down summing circuit as the direction change occurs with the −1 interval at which time the adder has a count of 0.

It will accordingly be understood that there has been disclosed a pulse to step motor stabilizing circuit that changes the rates of energization of a stepping motor more smoothly than the rate of changes in command pulses. In addition to smoother rate changes, the system senses at least excessive deviation of the instantaneous rotor position from its energized position and slightly alters the rate of energization changes to decrease the deviation. The system thus tends to minimize the possibility of unsatisfactory operation especially under conditions of moderate velocities with light or no load.

Variations and modifications may be made within the scope of the claims and portions of the improvements may be used without others.

I claim:

1. A pulse to step motor stabilizing circuit comprising means for receiving command pulses with the pulses appearing as a set number of essentially evenly-spaced pulses in consecutive equal length time intervals, oscillator means for producing a motor pulse for each command pulse, motor means for receiving the motor pulses and producing a step for each motor pulse, summing means for providing an instantaneous count of the difference between the number of command pulses and the number of motor pulses and means for causing the oscillator to produce motor pulses at a rate that is essentially equal to the instantaneous count for a time interval, in which the summing means includes counter means for increasing its count for each command pulse and decreasing its count for each motor pulse, in which the instantaneous count of the counter means for a time interval is generally equal to the number of pulses in the prior interval and in which substantially each motor pulse lags its corresponding command pulse by a duration that essentially equals the extent of a time interval.

2. The invention as defined in claim 1 in which the duration is generally within a range of plus or minus one-fifth of the extent of a time interval about the extent of the time interval.

3. The invention as defined in claim 1 in which the maximum duration is no greater than one half the duration of a time interval.

4. The invention as defined in claim 1 in which there is a first number of pulses in a first time interval and a second number of pulses in the next time interval and in which the average rate of the motor pulses gradually changes from the first number to the second number during the next time interval.

5. The invention as defined in claim 1 in which the command pulses have a maximum number of pulses per time interval and in which the summing means has a maximum count that approximates the maximum number of command pulses.

6. The invention as defined in claim 1 in which the motor means includes a rotor and windings, in which the energization of the windings is changed for each step and in which there are means for sensing an excessive phase angle between the rotor and the energized windings and including means for sensing the value of current induced in the motor windings with a change of energization of the windings and means for altering the rate of the oscillator means in accordance with the excessiveness of the phase angle of decrease the excessiveness.

7. The invention as defined in claim 6 in which the altering means is effective to alter the rate of the oscillator means a maximum of approximately ten percent of the rate set by the summing means.

8. The invention as defined in claim 7 in which the altering means increases the rate of the oscillator means as the phase angle excessively decreases.

9. The invention as defined in claim 7 in which the altering means decreases the rate of the oscillator means as the phase angle excessively increases.

10. A stepping motor stabilizing circuit comprising a stepping motor having a rotor and energizable motor windings, means for receiving command pulses, means for changing the energization of the windings for each command pulse, means for sensing at least an excessive phase angle relationship between the rotor position and the position dictated by the energized windings including means for sensing the current in the motor windings and means for altering the rate of changes of energization to decrease the excessive phase angle.

11. The invention as defined in claim 10 in which the rate of changes is increased for an excessive leading phase angle.

12. The invention as defined in claim 10 in which the rate of changes is decreased for an excessive lagging phase angle.

13. A pulse to step motor stabilizing circuit comprising a variable rate oscillator means for producing motor pulses at a rate commanded by a command signal, motor means for receiving the motor pulses and producing a step for each motor pulse, said motor means including a rotor and windings with each motor pulse effecting a change of energization of the motor's windings, means for sensing an excessive phase angle between the rotor and the energized windings including means for sensing the value of current in the motor windings and means for altering the rate at which the oscillator means is commanded to produce motor pulses by the command signal in accordance with the excessiveness of the phase angle to decrease the phase angle.

14. The invention as defined in claim 13 in which the oscillator means includes a gain terminal for altering the rate of the command pulses from that commanded by the command signal and in which the phase angle sensing means produces a signal that is applied to the gain control.

15. The invention as defined in claim 14 in which the gain control is capable of altering the rate of the command pulses no more than on the order of ten percent.

16. The invention as defined in claim 13 in which the phase angle sensing means includes a capacitor connected to be charged by the induced currents and in which the signal to the gain control is related to the charge on the capacitor.

17. The invention as defined in claim 13 in which the means for altering is capable of altering the rate in both directions from the rate commanded by the command signal.

18. The invention as defined in claim 17 in which the means for altering increases the rate of the motor pulses for a leading phase angle.

19. The invention as defined in claim 18 in which the means for altering decreases the rate of the command pulses for a lagging phase angle.

* * * * *